(12) United States Patent
Quinton et al.

(10) Patent No.: US 6,754,313 B1
(45) Date of Patent: Jun. 22, 2004

(54) APPLICATION PROGRAMMING INTERFACE FOR COMPUTER TELEPHONE SETS

(75) Inventors: Mary Michelle Quinton, Kirkland, WA (US); Zoltan C. Szilagyi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 09/654,407

(22) Filed: Sep. 1, 2000

Related U.S. Application Data

(60) Provisional application No. 60/169,532, filed on Dec. 7, 1999.

(51) Int. Cl.[7] .............................................. H04M 11/00
(52) U.S. Cl. ................................ 379/90.01; 379/93.17; 379/93.05
(58) Field of Search .......................... 379/90.01, 93.05, 379/93.09, 93.17, 93.23, 93.26, 201.01

(56) References Cited

U.S. PATENT DOCUMENTS 6,477,242 B1 * 11/2002 Freeny, Jr. ................ 379/93.24
6,515,695 B1 *  2/2003 Sato et al. ................ 348/14.08

FOREIGN PATENT DOCUMENTS

GB         2306871 A  *  6/1997   ........... G06F/17/00

OTHER PUBLICATIONS

Knutsin et al.; Multi–line wireless telephone computer interface; Jun. 24, 1999; WO 99/31826.*
Windows Platform Design, Support for USB Telephony Devices in Microsoft Windows, © 1999 Microsoft Corporation.
Umeno, Hiroo, Microsoft Systems Journal, For the Telephony API, Press 1; For Unimodem, Press 2; or Stay on the Line, Apr. 1998.
Microsoft Windows 2000 Server, IP Telephony With TAPI 3.0, White Paper, © 1999 Microsoft Corporation.
Universal Serial Bus Specification, Revision, 1.1, Sep. 23, 1998.
Universal Serial Bus Device Class Definition for Audio Devices, Release 1.0, Mar. 18, 1998.
Universal Serial Bus (USB), Device Class Definition for Human Interface Devices (HID), Firmware Specifiaction Apr. 7, 1999, Version 1.1, © 1996, 1997, 1998, 1999 USB Implementers' Forum.
U.S. patent application Ser. No. 09/157,469, filed Sep. 21, 1998, Quinton et al.
U.S. patent application Ser. No. 09/649,510, filed Aug. 25, 2000, Quinton.

* cited by examiner

*Primary Examiner*—Melur Ramakrishnaiah
(74) *Attorney, Agent, or Firm*—Leydig, Voit & Mayer, Ltd.

(57) ABSTRACT

Methods and systems for providing operating system support of computer telephone sets are described. Services are provided to standardize the interactions between computer telephony applications and telephone sets, to unify those interactions into a coherent whole, and to simplify the interactions by automatically performing common tasks. A default Telephone Manager provides all the functionality needed to support basic telephony. With all call processing performed on the host computer, telephone sets attached to the host need have no native intelligence. Support for transporting voice to distant locations is provided entirely by the host computer rendering the telephone set independent of any transport technology.

30 Claims, 8 Drawing Sheets

APPLICATION PROGRAMMING INTERFACE FOR COMPUTER TELEPHONE SETS

RELATED APPLICATIONS

This application claims the benefit of Provisional Patent Application No. 60/169,532 filed Dec. 7, 1999.

TECHNICAL FIELD

This invention relates generally to computer telephony, and more particularly to an application programming interface that supports computer telephone sets.

BACKGROUND OF THE INVENTION

Well-known today are several advantages of integrating a general-purpose computer with a telephone. However, these advantages have not yet been fully realized because existing methods of supporting computer telephony produce problems for developers of computer telephone sets, for developers of telephony applications, and for the intended users of computer telephony.

Developers of computer telephone sets find that existing operating systems provide only low-level support for telephony. These operating systems may support the functionality of some basic input/output devices, such as a microphone, speaker, video camera, and video display, but do not provide the integrated functionality of a working telephone set. Thus, every computer telephone set developer must implement all of that functionality, which functionality includes not only support for dialing and for transmitting the voices of the call participants, but also the call model for the telephone set interface, that is, the full set of logical states that the telephone interface can assume and the transitions among those states. When the developer completes this arduous implementation task and presents the results in an application programming interface (API), that API is most often limited to supporting only the particular model of computer telephone set produced by the developer. By requiring that this implementation effort be duplicate by all developers of new computer telephone sets, existing methods of supporting computer telephony increase development costs.

As a further problem, developers of computer telephone sets put much of their call model logic into the telephone sets themselves, producing peripherals that are independently functioning devices with some connection to the host computer. Relatedly, computer telephone sets are often developed to use one particular technology for transporting voice to distant locations, be it a local area network connection, a connection to a wide area network (often Internet Protocol based), an Integrated Services Digital Network line, or a standard analog telephone line. Consequently, these peripherals are very complicated internally, expense to develop and support, and inflexible in the face of new developments in voice transport technology.

The promise of computer telephony does not end with providing a replacement for the simple telephone set. Applications, such as voice mail and interactive voice response systems, can be built to use computer telephone sets. However, current methods of supporting computer telephony present unique problems to the developers of these applications. Applications often must be written to accommodate the specific API provided by the developer of one computer telephone set and must be rewritten to run on other platforms. This again leads to duplication of development efforts and increased development costs.

As a further result of the duplication of efforts by developers of computer telephone sets and by developers of computer-telephony applications, users are often faced with similar looking devices that function in different and confusingly incompatible ways.

SUMMARY OF THE INVENTION

The above problems and shortcomings, and others, are addressed by the present invention, which can be understood by referring to the specification, drawings, and claims. In accordance with one aspect of the invention, a set of services is presented to computer telephony applications in the form of an API. This API standardizes the interactions between applications and telephone sets, unifies those interactions into a coherent whole, and simplifies the interactions by automatically performing common tasks.

A further aspect of the present invention provides to telephony applications a complete Telephone Manager service. By extending the telephony API, this aspect does once what each individual developer had to do before the invention, that is, it implements the entire call control functionality for a basic telephone. This helps application developers in two interrelated ways. First, this aspect of the invention provides a default call model. Computer telephony applications may be developed relying solely on the services provided by this aspect without demanding any special software implementation work by the developer. Second, call services may now be implemented independently of the underlying hardware devices. Application developers are free to concentrate their efforts on extending the basic call control model, again focusing on the truly new features their products provide.

These aspects help developers of computer telephone sets as well. Developers need no longer provide custom APIs to applications, knowing that the API provided by the operating system allows their new computer telephone sets to work with any telephony application. Also, with the operating system's Telephone Manager providing intelligence for call control, signaling, and media processing, developers can remove much of the processing capability, and expense, from their products. Because the telephone sets need do no processing themselves, they are inexpensive to produce and do not require software upgrades. Finally, the API provides a universal link to the telephone sets which allows the host computer to completely support transporting voice to distant locations. Thus, developers of computer telephone sets are relieved of the complication of supporting any and all of the transport technologies currently in use. Their products no longer need to be upgraded or replaced when new transport technologies are introduced.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The first section of this detailed description presents an exemplary hardware and operating environment in which the present invention may be practiced. The next two sections describe a general computer telephony API in accordance with one aspect of the present invention. The fourth section builds on the general API, adding specific support for computer telephone sets. The fifth section shows how the present invention may be practiced to produce a Telephone Manager application with a default call model. The last four sections show how the present invention supports "dumb" computer telephone sets, that is, telephone sets controlled by call processing routines run on the host computer.

An Exemplary Hardware and Operating Environment

Figure 1:
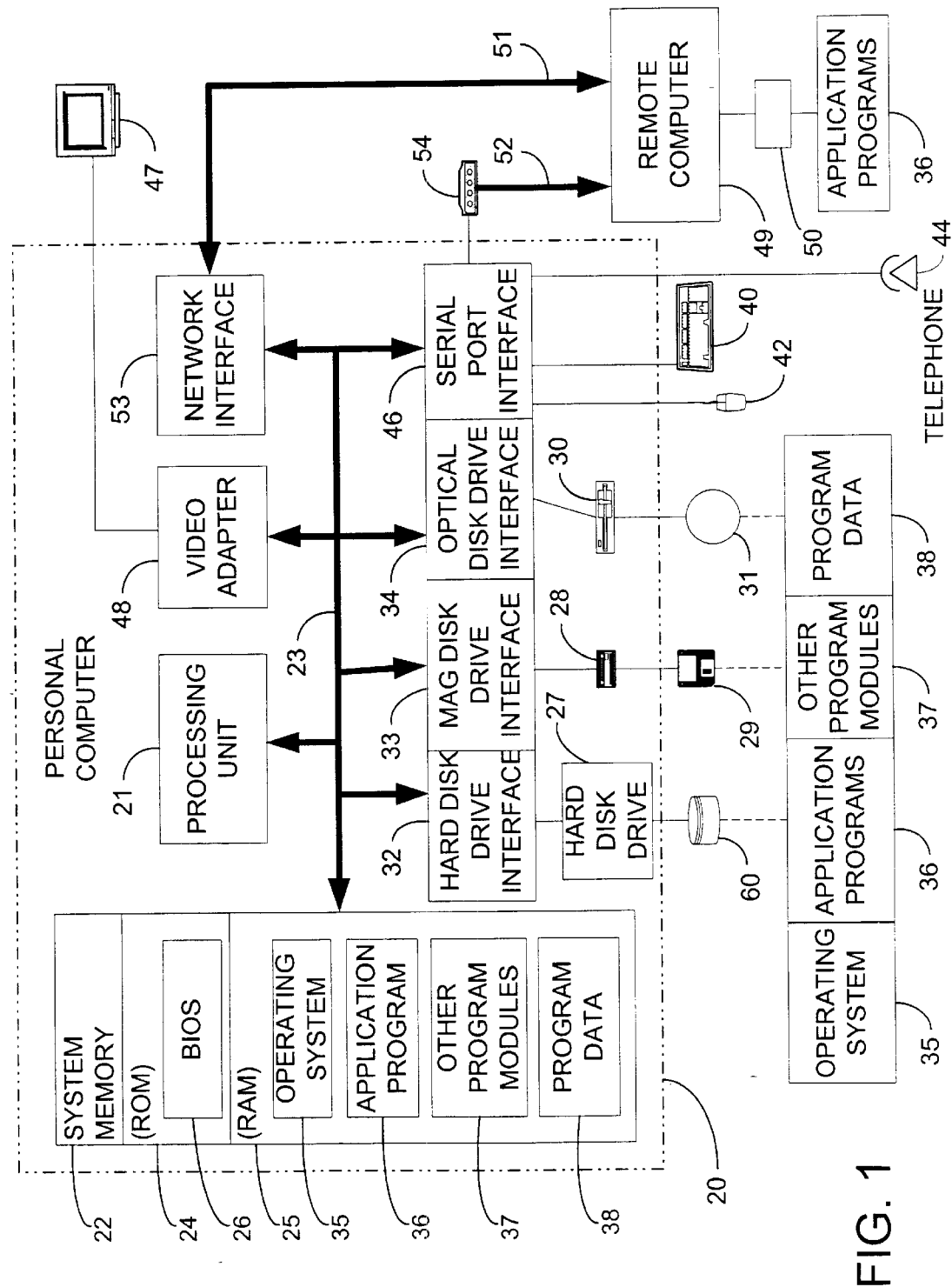
FIG. 1 is a block diagram generally illustrating an exemplary computer system which may support the present invention.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general-purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises either a single central-processing unit or a plurality of processing units in what is commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory and includes read only memory (ROM) 24 and random access memory (RAM) 25. A basic input/output system 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical medium.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computer 20. It should be-appreciated by those skilled in the art that any type of computer-readable medium which can store data accessible by a computer, such as magnetic cassettes, flash memory cards, digital video disks, Bernoulli cartridges, random access memories, read only memories, and the like, may be used in the exemplary operating environment.

A number of program modules may be stored on the hard disk 60, magnetic disk 29, optical disk 31, ROM 24, or RAM 25, including an operating system 35, one or more application programs 36, other program modules 37, and program data 38. Often, the operating system 35 offers services to application programs 36 by way of one or more APIs (not shown). Because the operating system 35 incorporates these services, developers of application programs 36 need not redevelop code to use the services. For example, the U.S. patent application Ser. No 09/157,469, "Computer Telephony Application Programming Interface," describes an operating system API that offers to application programs 36 the services of a microphone and speakers. Other examples of APIs provided by operating systems such as Microsoft's "WINDOWS" are well-known in the art.

A user may enter commands and information into the personal computer 20 through input devices such as a keyboard 40, a pointing device 42, and a computer telephone set 44. Other input devices (not shown) may include a microphone, joystick game pad, satellite dish, scanner, and the like. These and other input devices are often connected to the processing unit 21 through a serial port interface 46 that is coupled to the system bus, but may be connected by other interfaces, such as a parallel port, game port, or a Universal Serial Bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved via a communication device; the invention is not limited to a particular type of communications device. The remote computer 49 may be another computer, a server, a router, a network PC, a client, a peer device, or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets, and the Internet.

When used in a LAN networking environment, the computer 20 is connected to the LAN 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

A General API for Computer Telephony

Figure 2:
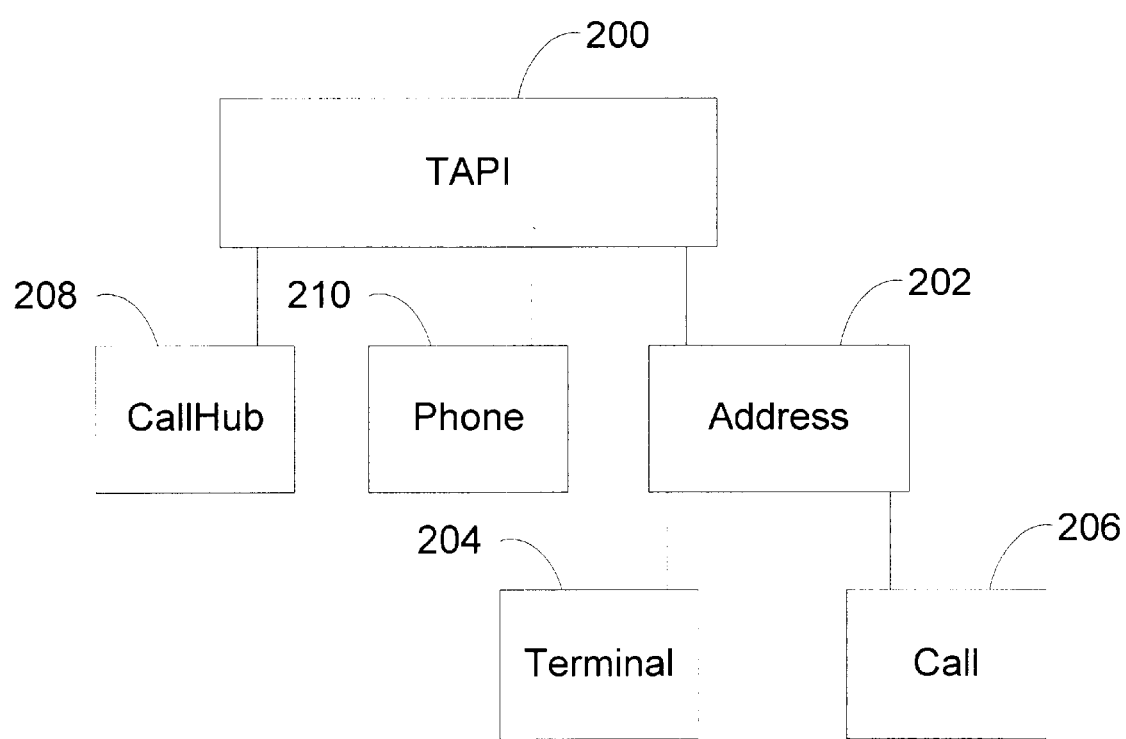
FIG. 2 is a block diagram of an object hierarchy according to one embodiment of the invention.

In this section of the detailed description, a description of a computerized system according to one embodiment of the invention is provided. The description is provided by reference to FIG. 2 and FIG. 3. Referring first to FIG. 2, an object hierarchy according to an embodiment of the invention is shown. The system includes a Telephony Application Programming Interface (TAPI) object 200, an Address object 202, a Terminal object 204, a Call object 206, and a Call-Hub object 208. For each of objects 202, 204, 206, and 208, only a single object of each type is shown in FIG. 2 for purposes of clarity; however, there can be in one embodiment of the invention multiple instantiations of each of these objects. Each of the objects 202, 204, 206, and 208 may in one embodiment correspond to a specific means for performing functionality of the object. The link between the objects and the underlying hardware can be effected in various ways that are beyond the scope of the present invention and that are well-known in the art. As an example of how such links are effected, please see "For the Telephony API, Press 1; For Unimodem, Press 2; or Stay on the Line" in the Microsoft Systems Journal of April, 1998.

The TAPI object 200 provides an interface by which computer programs can access the functionality provided by these other objects. This means that the computer programs themselves do not have to include code for this functionality, but instead can rely on the functionality provided by the objects themselves as already existing, and as interfaced to such programs via the TAPI object 200.

The Address object 202 is a type of first-party call control object. A call control object is an object that provides for the initiation and termination of a computer telephony call having a media stream—that is, the object provides for the connection and ending of a call. In particular, the Address object 202 is an object over which a computer telephony call may be placed. That is, the Address object 202 represents a line or device that can make or receive calls on it. In different embodiments of the invention, the object represents a modem attached to a PSTN (Public Switched Telephone Network) telephone line, an ISDN (Integrated Services Digital Network) hardware card attached to an ISDN line, a DSL (Digital Subscriber Loop) modem attached to a PSTN telephone line having DSL capability, and an IP (Internet Protocol) address that is able to make IP telephony calls. However, the invention is not limited to a particular representation. The Address object 202 is a first-party call control object in that it relates to a party of the telephone call—for example, the caller or callee of the telephone call—as opposed to a third party not specifically of the telephone call.

The Terminal object 204 is a type of media control object. A media control object is an object that end-points the media stream of a computer telephony call. The media stream of a computer telephony call is the information that actually makes up the call—for example, audio information in the case of a voice call and audio and image information in the case of a video call. A media control object end-points the media stream in that it can be a sink object, which is a finishing end point such as a speaker or a monitor where the media stream ends or is "sunk" after it has been communicated from one party to the call to another party to the call, or a source object, which is a beginning end point such as a microphone or a camera where the media stream begins or is "sourced" such that it is then communicated from one party to the call to another party to the call. The Terminal object 204 can represent physical devices, such as the microphone or speakers on a sound card, a video camera, and a telephone set, as well as more dynamic, virtual devices, such as a video window on the screen, a file to which the media stream is saved, and a DTMF (Dual Tone Multiple Frequency) detector.

The Call object 206 is another type of first-party call control object. In particular, the Call object 206 represents an end-point of the computer telephony call. For example, for a caller to callee direct call, there would be two Call objects 206, a first object representing the first end point of the call and a second object representing the second end point of the call. In a conference call, there would be more than two Call objects 206, one Call object 206 for each participant (end point).

The Call-Hub object 208 is a third-party call control object. The Call-Hub object 208 relates the Call objects 206 for a particular computer telephony call. In other words, it represents a telephony connection itself and is basically a collection of Call objects that are all related because they are on the same telephony connection. For example, one type of Call-Hub object 208 is a tracking object in a call center environment, to track the callers on a particular call and the duration of the telephone call. A third-party call control object is also able to initiate and terminate a telephone call.

However, the object is a third-party call control object in that it does not specifically relate to a particular party of the telephone call, but rather may encompass all the parties of the call (as well as information regarding the call).

Figure 3:
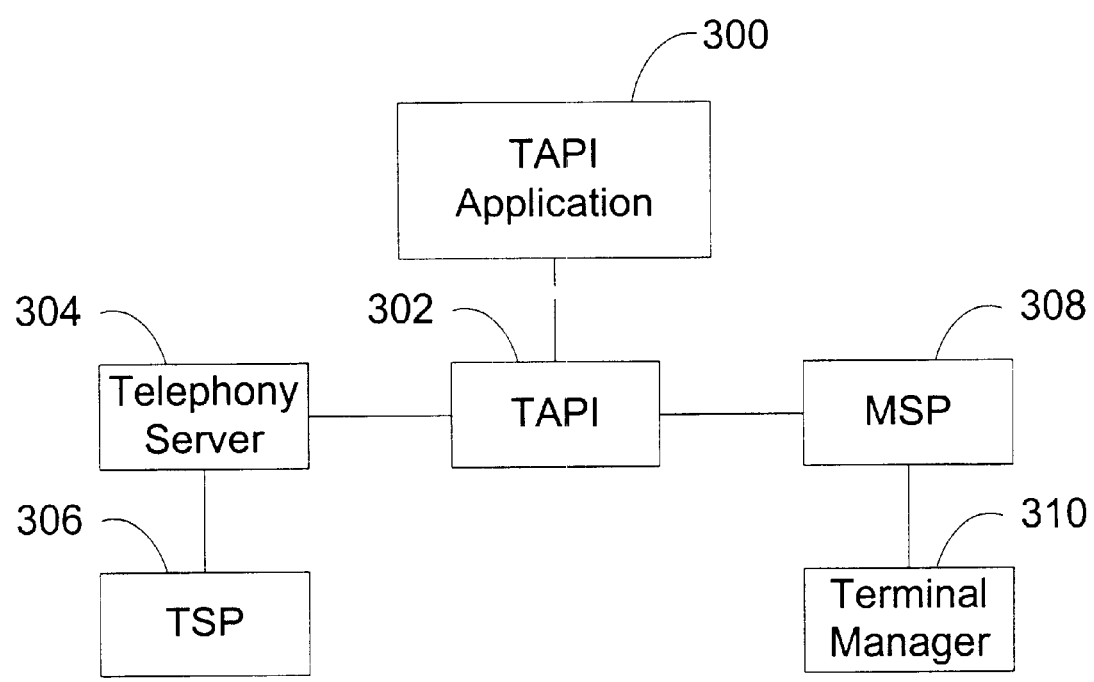
FIG. 3 is a block diagram of an architecture according to one embodiment of the invention.

Referring next to FIG. 3, a block diagram of an architecture according to one embodiment of the invention is shown. The architecture includes a TAPI application 300, the TAPI 302, a telephony server 304, a telephony service provider 306, a media stream provider 308, and a terminal manager 310. The TAPI application 300 is a computer program that utilizes the functionality provided by the TAPI 302. That is, the TAPI application 300 is any type of computer program that utilizes the TAPI 302, through which the application is able to access telephony call control and media control functionality provided by the TAPI 302.

The telephony server 304 and the telephony service provider 306 make up the call control aspects of the architecture of FIG. 3. The telephony server 304 keeps track of all telephony capabilities on a given computerized system; for example, such as that found within versions of Microsoft's "WINDOWS NT" operating system. The telephone service provider 306 is a component used to control a specific piece of telephony hardware. Although only one provider 306 is shown in FIG. 3, the invention is not so limited; there can be many such providers installed.

The media stream provider 308 and the terminal manager 310 make up the media control aspects of the architecture of FIG. 3. The media stream provider 308 is an extension of the provider 306 and works together with the provider 306 to implement call control (via the provider 306) and media control (via the provider 308). All call control requests proceed through the telephony server 304 to the provider 306, and all media control requests proceed through to the provider 308. The media stream provider 308 is a component used to control a specific media stream (audio, video, etc.). Furthermore, there is a media stream provider 308 for each different media stream; although only one provider 308 is shown in FIG. 3, the invention is not so limited-there can be many such providers installed.

The terminal manager 310 is a media control manager. It is a component that instantiates a media control object for each installed multimedia device. That is, it is a component that allows telephony applications (such as application 300) to use any multimedia device installed within a telephony environment. When the manager 310 is initialized, it discovers all multimedia devices that it can use that are installed on a given computer, such as sound cards, video capture cards, as well as other multimedia hardware; the invention is not so limited. The manager then creates a media control object, such as a Terminal object, for each of these devices. The manager 310 also creates Terminal objects or media control objects for other media sources or sinks that do not necessarily correspond to hardware, but rather to virtual devices. These types of devices represent media stream processing that is performed by the computer itself, rather than specific hardware. For example, these types of terminals may include a video window, a speech recognition engine, and a file; the invention is not so limited.

The TAPI 302 in one embodiment has an interface that defines how the provider 308 communicates with the terminal manager 310. This interface allows any provider 308 (there may be more than one provider 308, although for purposes of clarity only one is shown in FIG. 3) to query the manager 310 for the devices that are represented as Terminal or media control objects. The interface also allows the provider 308 to determine from the manager 310 how to include these devices within media streams that the provider 308 is to set up. Therefore, the manager 310 allows any provider 308 to access the same set of Terminal or media control objects and use them with any telephony hardware.

Exemplary Methods of the General Computer Telephony API

In this section of the detailed description, exemplary methods according to embodiments of the invention are presented. This description is provided in reference to FIGS. 4(a) and 4(b). These exemplary methods are desirably realized at least in part as one or more programs running on a computer—that is, as a program executed from a computer-readable medium such as a memory by a processor of a computer. The programs are desirably storable on a computer-readable medium such as a floppy disk or a CD-ROM for distribution and installation and execution on another (suitably equipped) computer.

Figure 4A:
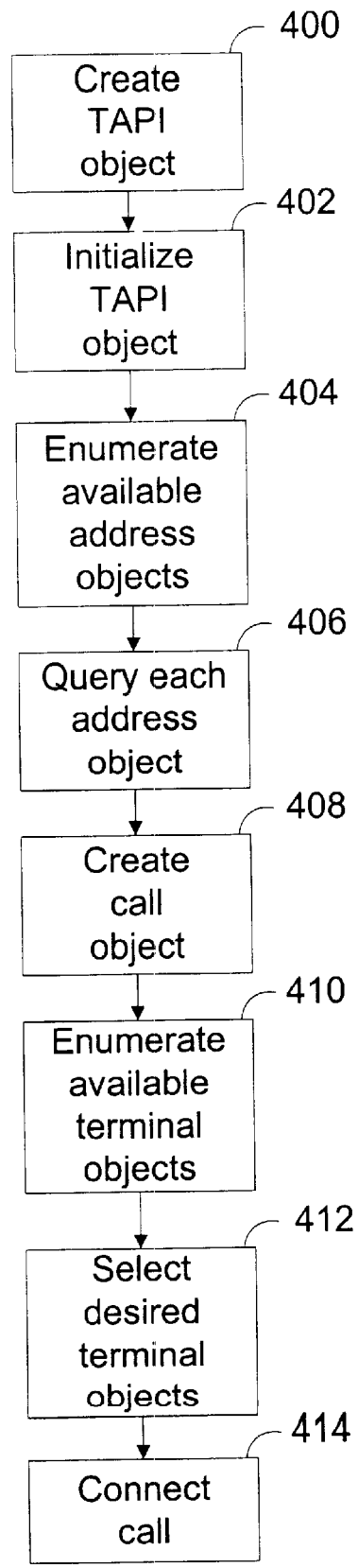
FIG. 4(a) shows a method for placing an outgoing computer telephony call according to one embodiment of the invention.

Thus, in one embodiment, a computer program is executed by a processor of a computer from a medium therefrom, where the program may include Address objects, Call objects, Terminal objects, and Call-Hub objects, as described in the previous section of the detailed description. Each of these objects may in one embodiment also correspond to a specific means for performing the functionality of the object. In another embodiment, the computer-program also includes a terminal manager, which detects a plurality of multimedia devices and instantiates a Terminal object for each multimedia device detected, as has also been described in the previous section of the detailed description. Referring now to FIG. 4(a), a flowchart of a method for placing an outgoing computer telephony call, according to an embodiment of the invention, is shown. In 400, a TAPI object is instantiated by an application program so that the program is able to use the functionality provided by the TAPI. In 402, the TAPI object is initialized. For example, a terminal manager is run to instantiate Terminal objects for physical and virtual multimedia devices, as has been described in the previous section of the detailed description.

In 404, the TAPI object is queried for an enumeration of the Address objects available from the TAPI object. Each Address object has certain telephony capabilities—for example, one may relate to an ISDN line and another to a PSTN line. Thus, in 406, each Address object is queried to learn its telephony capabilities. The desired Address object or objects are then selected, depending on the type of call desired (e.g., a regular voice call may go over a PSTN line while a video call may go over one or more ISDN lines).

In 408, a Call object is instantiated from a desired Address object or objects. The Call object thus relates to the computer performing the method of FIG. 4(a) as being the caller for a specific computer telephony call utilizing the desired Address object or objects. In 410, the desired Address object or objects are queried for an enumeration of the Terminal objects available from the Address object or objects. For example, an Address object relating to a PSTN line over which voice calls are placed may have a Terminal object relating to a microphone and a Terminal object relating to a sound card connected to a speaker. Depending on the type of call desired, then, in 412 at least one desired Terminal object enumerated in 410 is selected. Finally, in 414, the outgoing computer telephony call is connected (i.e., placed) over the desired Address object or objects utilizing the desired Terminal object or objects.

Thus, placing a computer telephony call according to the embodiment of the invention of FIG. 4(a) involves determining the Address objects that are available such that a call may be placed over them and selecting a desired Address object or objects. A Call object is created for the specific call to be placed. The Terminal objects that are available for the utilized Address objects are then determined, and the desired Terminal objects are selected. The call is then placed, such that the Address objects represent the communication media over which the call is placed, and the Terminal objects represent the multimedia devices that act as end points for the media stream communicated over the communication media.

Figure 4B:
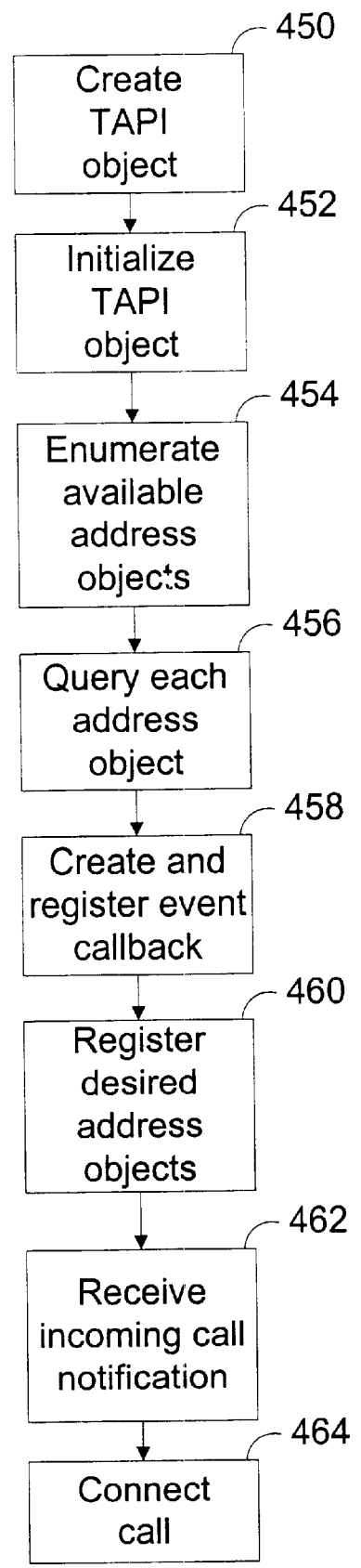
FIG. 4(b) shows a method for receiving an incoming computer telephony call according to one embodiment of the invention.

Referring next to FIG. 4(b), a flowchart of a method for receiving an incoming computer telephony call, according to an embodiment of the invention, is shown. In 450, a TAPI object is instantiated by an application program so that the program is able to use the functionality provided by the TAPI. In 452, the TAPI object is initialized. For example, a terminal manager is run to instantiate Terminal objects for physical and virtual multimedia devices, as has been described in the previous section of the detailed description.

In 454, the TAPI object is queried for an enumeration of the Address objects available from the TAPI object. Each Address object has certain telephony capabilities—for example, one may relate to an ISDN line and another to a PSTN line. Thus, in 456, each Address object is queried to learn its telephony capabilities. The desired Address object objects are then selected, depending on the type of call to be listened for (e.g., a regular voice call may be received over a PSTN line while a video call may be received over one or more ISDN lines).

In 458, an event callback is instantiated and registered on the TAPI object. The event callback is a request by the application program performing the method of FIG. 4(b) to have the TAPI object notify the application program when the desired event occurs—in this case, when an incoming call is received. In 460, the desired Address object or objects are also registered with the TAPI object. These are the Address object or objects over which an incoming computer telephony call is listened for by the TAPI object, such that upon occurrence of such an event, the application program performing the method of FIG. 4(b) is notified. Thus, in 462, a notification of an incoming computer telephony call from the TAPI object is received on the event callback. In 464, the incoming computer telephony call is connected (i.e., received) over the desired Address object or objects.

As has been described, receiving a computer telephony call according to the embodiment of the invention of FIG. 4(b) involves determining the Address objects that are available such that a call may be received over them, and selecting a desired Address object or objects. An event callback is created and registered, so that notification is received when a call arrives over the desired Address object or objects. The call is then received (created), such that the Address objects represent the communication media over which the call is received.

An API More Specific to Computer Telephone Sets

The general computer telephony API described in the preceding two sections is more than adequate for many applications, but there are times when it may be convenient to have one interface that gathers together the functions specific to telephone sets. The present invention, according to one of its aspects, builds upon the general computer telephony API to present such an interface. Computer telephony applications can use this interface to unify and simplify their interactions with telephone sets on the computer.

Developers of computer telephone sets can use this interface to free their products from dependence upon any particular technology for distant transport of voice. That functionality is now performed by the host computer. Note that this is reflected in what the interface detailed below lacks: it lacks any methods for the distant transport of voice. That is because this description is of the interface between the computer telephone set and its host computer. With all distant voice transport performed by the host computer, there is no need for this functionality to be reflected in this interface.

The Phone Object

The present invention may be embodied in an object-oriented interface. The core of that interface is the Phone object 210, shown in FIG. 2. First, the methods presented by the Phone object are detailed below. For the sake of conciseness, ::get( ) methods that merely complement ::put( ) methods are not listed. Next is described a subsidiary aspect of the Phone object, the AutomatedPhoneControl interface with its associated default TelephoneManager. Finally, the events that complement these methods are detailed.

Phone::Open( ) opens a telephone. The telephone remains open until the application calls Phone::Close( ) or the TAPI is shut down. While a telephone is open, the application receives events pertaining to the telephone. A telephone must be open with owner privilege for the application to set the state of the telephone.

Phone::Close( ) closes a telephone. The telephone remains closed until an application calls Phone::Open( ). While a telephone is closed, applications do not receive events pertaining to the telephone. When the telephone has been successfully closed, all selected calls are unselected from the telephone as if the application had called AutomatedPhoneControl::UnselectCall( ) (see below) before closing the telephone.

Phone::get_Addresses( ) returns a list of addresses on which the telephone can be used. A telephone can declare itself as being available on all addresses that support audio terminals. It can also declare itself as being preferred for an address or for a set of addresses. This method returns addresses for which the telephone is available or preferred. To get only addresses on which the telephone is preferred, use Phone::get_PreferredAddresses( ).

Phone::get_PreferredAddresses( ) returns a list of addresses for which the telephone is preferred.

Phone::get_PhoneCaps( ) retrieves capability information about the telephone.

Phone::get_Terminals( ) lists the terminals associated with the telephone. Terminals are specific to individual Address objects as different addresses may have different ways of accessing streaming devices.

Phone::get_ButtonMode( ) retrieves the button mode associated with a particular button. If the button mode is PBM_FEATURE, then the application should use Phone::get_ButtonFunction( ) to retrieve the specific meaning of the button.

Phone::get_ButtonFunction( ) retrieves the function associated with a particular button.

Phone::get_ButtonText( ) retrieves the text associated with a particular button.

Phone::get_ButtonState( ) retrieves the state associated with a particular button.

Phone::put_HookSwitchState( ) sets the hook switch state for a particular hook switch on the telephone. Typically, speakerphones and headsets have application-settable hook switch states, and handsets do not.

Phone::put_RingMode( ) requests the telephone to change its ring mode.

Phone::put_RingVolume( ) requests the telephone to change its ring volume. If the telephone is currently ringing, then the new volume takes effect immediately. If the telephone is not currently ringing, then the new volume takes effect the next time the telephone rings. The actual granularity and quantization of volume settings depend upon the maker of the telephone.

Phone::get_Privilege( ) retrieves privilege information about the telephone.

The AutomatedPhoneControl Interface

Subsidiary to the Phone object interface described above, this interface performs several high-level functions:

- It lets computer telephony applications enable and configure automated control of telephone signaling tones based on input from a telephone's hook switch and buttons. Signaling tones include, among others, dial tone, DTMF button press tones, ring back, busy, error, and ringing.
- It lets applications enable and configure automated call processing based on the state of the telephone's input devices, such as its hook switch, and on other events on the telephone call. The telephone call moves from one call state to another in response to these events. For example, if a telephone goes on hook during a connected call, this interface can automatically disconnect the call.
- It lets applications play specific tones on the audio devices associated with a telephone without having to directly access an audio API. Because the tones may be played outside of the context of a call, the tones are independent of the audio streaming functionality accessible through Terminal objects.
- It lets applications ring a telephone without knowing whether the telephone has a ringer and, if it does, what types of rings the telephone supports.

A description of the methods of the AutomatedPhoneControl interface will clarify what it does and how its functions fit together. For the sake of conciseness, ::get( ) methods that merely complement ::put( ) methods are not listed.

AutomatedPhoneControl::StartTone( ) stops any tone currently playing and starts playing a tone of the specified type. The tone continues to play until AutomatedPhoneControl::StopTone( ) is called, another tone is started, or, if a nonzero duration for the tone is specified, the specified amount of time passes. While most tones have a constant nonzero amplitude, the amplitudes of the busy, ring back, and error tones alternate between zero and nonzero. When these tones are generated, this interface automatically switches their amplitudes on and off at the correct times.

AutomatedPhoneControl::StopTone( ) stops any tone currently playing.

AutomatedPhoneControl::get_Tone( ) returns the type of tone, if any, that is currently playing.

AutomatedPhoneControl::StartRinger( ) generates an incoming ring. The ring continues until AutomatedPhoneControl::StopRinger( ) is called, another ring is started, or, if a nonzero duration for the ring is specified, the specified amount of time passes. The computer telephony application calling this method can either specify the type of ring to produce or can leave that up to the interface. In the later case, the interface may use a telephone's ringer device (if it has one) or it may play the ring through a speakerphone or earpiece, as appropriate. Because the amplitude of the ring tone alternates between zero and nonzero, this interface automatically switches that amplitude on and off at the correct times.

AutomatedPhoneControl::StopRinger( ) stops any incoming ring currently playing.

AutomatedPhoneControl::get_Ringer( ) tells whether or not the telephone is currently playing an incoming ring initiated by AutomatedPhoneControl::StartRinger( ).

AutomatedPhoneControl::put_PhoneHandlingEnabled( ) enables or disables all of the automatic telephone handling features for a telephone. Typically, an application will use other aspects of the AutomatedPhoneControl interface to configure features before calling this method to enable the features. Phone::Close( ) disables the features.

AutomatedPhoneControl::put_AutoEndOfNumberTimeout( ) controls how long to wait after a digit is pressed before assuming that an entire telephone number has been dialed. A value of zero turns off this timeout, thus basing end-of-dialed-number detection solely on the detection of a # or SEND button. End-of-dialed-number detection is suspended when a call to AutomatedPhoneControl::SelectCall( ) succeeds and stays suspended until the call is unselected.

AutomatedPhoneControl::put_AutoDialtone( ) enables or disables automatic dial tone generation for a telephone. When enabled, dial tone is produced on a telephone's audio render device when the telephone goes off hook. However, dial tone is not produced if the telephone is ringing when it goes off hook. Dial tone generation is suspended when a call to AutomatedPhoneControl::SelectCall( ) succeeds and stays suspended until the call is unselected.

AutomatedPhoneControl::put_AutoStopTonesOnOnHook( ) enables or disables automatic tone termination for a telephone. When enabled, all tones playing on the telephone's audio render device are stopped when the telephone goes on hook.

AutomatedPhoneControl::put_AutoStopRingOnOffHook( ) enables or disables automatic incoming ring termination for a telephone. When enabled, incoming ring tones playing on the telephone are disabled when the telephone goes off hook.

AutomatedPhoneControl::put_AutoKeypadTones( ) enables or disables automatic telephone keypad tone generation. When enabled, a digit tone is played whenever a keypad button is pressed. If the telephone reports a button press as a key down event, then the tone is played until the telephone reports a key up event or until the minimum keypad tone duration has passed, whichever is longer. Keypad tones are generated only when the telephone is off hook. If another tone, such as RingBack, is playing, it is interrupted by the keypad tone and restored when the keypad tone stops.

AutomatedPhoneControl::put_AutoKeypadTonesMinimumDuration( ) sets the minimum duration of the keypad tone. If this minimum duration elapses before the telephone reports a key up event, then the keypad tone continues to play until the key up event is reported.

AutomatedPhoneControl::put_AutoVolumeControl( ) enables or disables the automatic volume control on a telephone. When enabled, the telephone's wave output volume is automatically adjusted whenever a volume button is pressed. The volume is adjusted by the amount set by AutomatedPhoneControl::put_AutoVolumeControlStep( ).

AutomatedPhoneControl::put_AutoVolumeControlStep( ) sets the amount by which a telephone's volume is adjusted in response to a volume button press.

AutomatedPhoneControl::put_AutoVolumeControlRepeatDelay( ) sets the delay before a volume button starts repeating when held down.

AutomatedPhoneControl::put_AutoVolumeControlRepeatPeriod( ) sets the period of button epeats when a volume button is held down.

Figure 5:
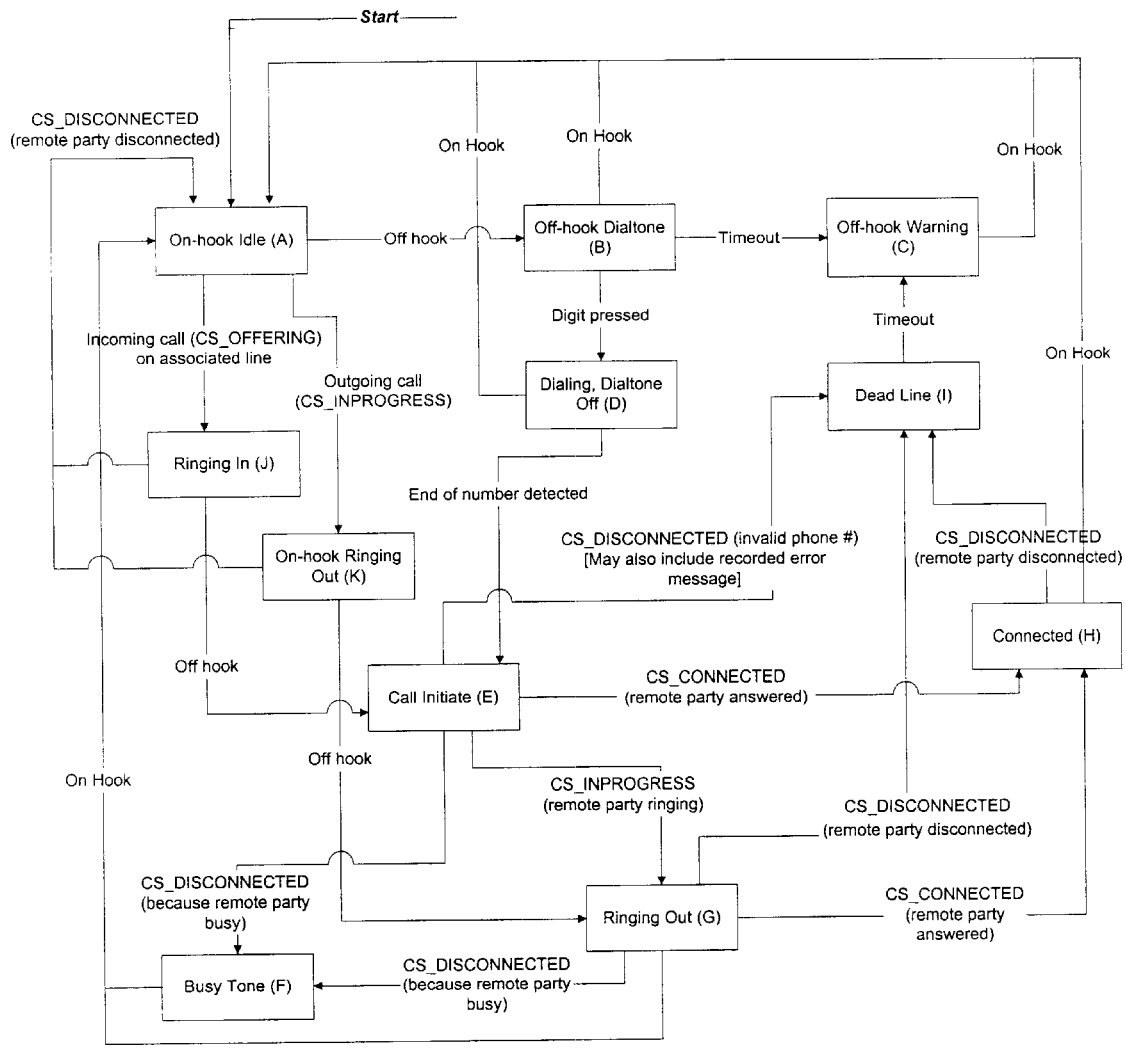
FIG. 5 presents a basic telephone call model to illustrate some of the functional logic underlying the default Telephone Manager embodiment of the present invention.

AutomatedPhoneControl::SelectCall( ) puts a call under the control of the default Telephone Manager. The default Telephone Manager may be thought of as a stand-alone application and is described as such in a later section. For now, it is described as a service provided by the AutomatedPhoneControl interface, performing the following processing on the selected call. The telephone call states and the transitions among them are illustrated in FIG. 5.

- When the telephone goes on hook, the Phone object disconnects any currently handled call that is not already in the CS_DISCONNECTED call state.
- If a selected call reaches the CS_DISCONNECTED call state, then the Phone object calls AutomatedPhoneControl::UnselectCall( ) to unselect the call.
- If the telephone is closed, any selected call is unselected from the telephone.
- When the telephone goes off hook or a call is selected when the telephone is off hook, the Phone object answers the call if it is in the CS_OFFERING call state.
- The Phone object calls AutomatedPhoneControl::StartTone(RingBack) if the telephone is off hook and a call is selected in, or a selected call enters, the CS_INPROGRESS call state.
- The Phone object calls AutomatedPhoneControl::StopTone( ) when a call is selected in, or when a selected call enters, the CS_CONNECTED call state.
- The Phone object calls AutomatedPhoneControl::StartRinger( ) when the telephone is on hook and a call is selected in, or a selected call enters, the CS_OFFERING, CS_INPROGRESS, or CS_CONNECTED call state.
- The Phone object performs one of the following actions when a call is selected in, or when a selected call enters, the CS_DISCONNECTED call state.
  - If the telephone is on hook, then the Phone object calls AutomatedPhoneControl:: StopRinger( ).
  - If the telephone is off hook and the CS_DISCONNECTED call state was caused by a CEC_DISCONNECT_BUSY, then the Phone object calls AutomatedPhoneControl::StartTone(Busy).
  - If the telephone is off hook and the CS_DISCONNECTED call state was caused by a CEC_DISCONNECT_NORMAL, then the Phone object calls AutomatedPhoneControl::StopTone( ).
  - If the telephone is off hook and the CS_DISCONNECTED call state was not caused by either of the two states mentioned above, then the Phone object calls AutomatedPhoneControl::StartTone(Error).

AutomatedPhoneControl::UnselectCall( ) removes the specified call from a Phone object, releasing the Phone object's reference to the Call object. The Phone object performs no further call processing on the call.

AutomatedPhoneControl::get_SelectedCalls( ) lists the calls currently selected on a telephone.

The PhoneEvent Interface

Object-oriented interfaces are characterized both by the methods they present to applications and by the events they pass up to the applications. Events inform the applications about important status changes. This is a description of event handling and of some of the events associated with the Phone and AutomatedPhoneControl interfaces.

PhoneEvent::get_Phone( ) returns a pointer to the Phone object that created the event.

PhoneEvent::get_Event( ) tells the type of telephone event that just occurred.

PhoneEvent::get_ButtonState( ) tells which state the button just entered. This is only available when PhoneEvent::get_Event( ) reports a PE_BUTTON event.

PhoneEvent::get_HookSwitchState( ) tells the state the hook switch just entered This is only available when PhoneEvent::get_Event( ) reports a PE_HOOKSWITCH event.

PhoneEvent::get_HookSwitchDevice( ) tells which hook switch device just changed its state. This is only available when PhoneEvent::get_Event( ) reports a PE_HOOKSWITCH event.

PhoneEvent::get_RingMode( ) tells the ring mode to which the telephone just transitioned. This is only available when PhoneEvent::get_Event( ) reports a PE_RINGMODE event.

PhoneEvent::get_ButtonLampId( ) tells which button or lamp triggered the event. This is only available when PhoneEvent::get_Event( ) reports a PE_LAMPMODE or a PE_BUTTON event.

PhoneEvent::get_NumberGathered( ) returns the telephone number that was just gathered. This is only available when PhoneEvent::get_Event( ) reports a PE_NUMBERGATHERED event.

The AutomatedPhoneControl interface creates a PE_NUMBERGATHERED event when it finishes gathering a dialed telephone number. Gathering ends when: the end-of-dialed-number timeout expires, the # key is pressed, or the SEND key is pressed.

The AutomatedPhoneControl interface creates a PE_DIALING event when it enters the dialing state. That occurs when the user presses a telephone keypad button while dial tone is playing.

The AutomatedPhoneControl interface creates a PE_ANSWER event when it answers the call selected on the telephone. This occurs when: the telephone is off hook and a call in the CS_OFFERING state is selected, the telephone is off hook and a selected call enters the CS_OFFERING state, or the telephone goes off hook when a selected call is in the CS_OFFERING state.

The AutomatedPhoneControl interface creates a PE_DISCONNECT event when it disconnects a selected call. This occurs when the telephone goes on hook and the call is not already in the CS_DISCONNECTED state.

An Illustrative Telephone Manager and Default Call Model

In this section, another embodiment of the invention is described, wherein the abstraction goes a step further and all basic telephony functions are abstracted by the operating system into the default Telephone Manager.

The default Telephone Manager is described above as a service provided by the computer telephony API to application programs. It may also be seen as a fully functional application running within the computer's operating system. It provides all basic telephony services so that a user can plug in a computer telephone set and use it as she would use an analog POTS (Plain Old Telephone Service) telephone, without having to procure any additional software at all. The default Telephone Manager can run without the user ever being consciously aware of its presence on her computer. If she picks up a computer telephone set, she hears dial tone. She may place a call by dialing on the telephone's keypad and may then converse until she drops the connection by hanging up. Incoming calls may also be handled transparently by the default Telephone Manager, that is, the default Telephone Manager sends a ringing tone to be played on the computer telephone set's speaker. The user answers the call by picking up the handset and conversing. Transport of voice to distant locations is provided by the host computer completely transparently to the computer telephone set.

To provide telephony services so transparently, the default Telephone Manager must implement all the basic functionality of the telephone system. Clearly, it must carry voice between distant and local users, respond correctly to DTMF tones, and monitor the state of the hook switch. Less apparently, however, it must implement the call model that underlies the logic of a telephone call, that is, it must understand all the logical states of a telephone call and the transitions among them. To illustrate this point, FIG. 5 gives an example of the kind of call model that the default Telephone Manager implements.

By providing basic telephone functionality, the default Telephone Manager allows computer telephone set developers to concentrate on their hardware products, knowing that the host computer will provide all the foundational software to support them. Telephony application developers may use the default Telephone Manager as a jumping off point, concentrating on adding the unique functionality of their applications rather than redeveloping the core. If they choose to do so, they know that the default Telephone Manager enforces interoperability among computer hardware developers. Users benefit because similar telephony devices and applications function in similar ways.

The default Telephone Manager is not restricted to remaining entirely basic and transparent, however. It may allow computer-screen-based dialing, possibly supporting dialing by selecting the called party by name, e-mail address, IP address, or the like. It could also put up a caller ID window on the computer for incoming calls.

An Illustrative "Dumb" Computer Telephone Set

The embodiment of the invention just described supports computer telephone sets that are entirely "dumb," that is, that contain no native intelligence. These telephones merely capture the local user's voice in a microphone and send it to the host computer, and render sound received from the host on a speaker. To illustrate the power of the default Telephone Manager, and to present a further embodiment of the invention, this section illustrates "dumb" computer telephone sets and their interactions with a host computer running the default Telephone Manager.

System Architecture of "Dumb" Computer Telephone Set and Host Computer

Figure 6:
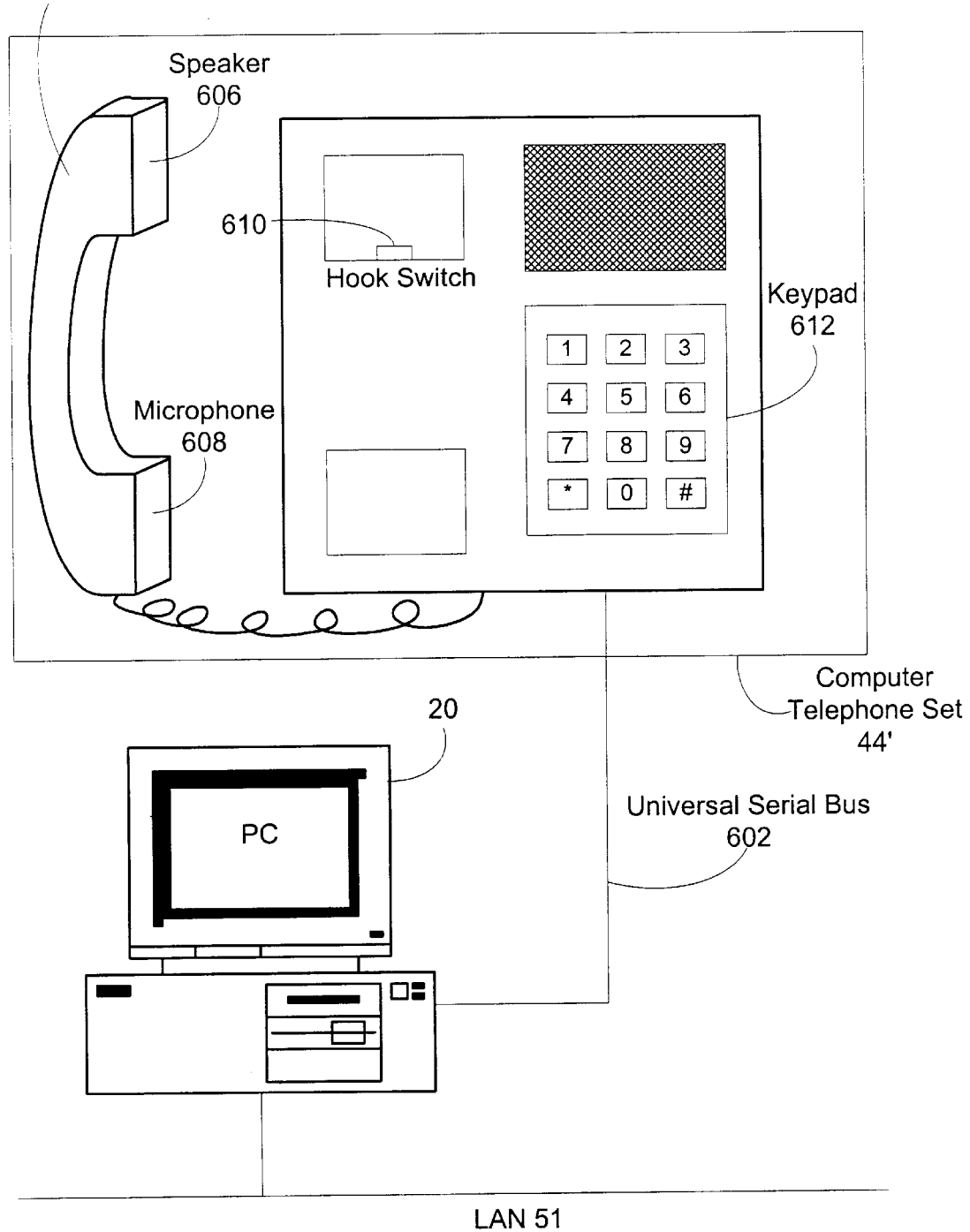
FIG. 6 shows a host computer connected to a "dumb" computer telephone set in accordance with one embodiment of the invention.

Referring to FIGS. 1 and 6 and in accordance with one aspect of the invention, a "dumb" computer telephone set 44' is connected to a host computer 20 via a digital communications interface, represented in FIG. 6 by a USB 602. Alternatively, they may be connected via the LAN 51.

The host computer 20 can also communicate with remote users, that is to say, with users other than the user of the host computer itself. The interface to these "wide area" communications is illustrated in FIG. 6 by the LAN 51. The host computer may communicate with remote users over interfaces in addition to, or instead of, the LAN, such as the modem 54, a POTS line, ISDN or other digital line, radio or infrared link, or trunk. The computer telephone set 44' is entirely independent of whatever type of wide area communications technology the host computer uses.

FIG. 6 also shows the basic human interface expected of a telephone set. The handset 604 contains a speaker 606 and a microphone 608. The handset rests in a hook switch 610. A keypad 612 may be provided for "dialing" the telephone number of a remote user or for other input.

Architecture of the "Dumb" Computer Telephone Set Itself

Figure 7:
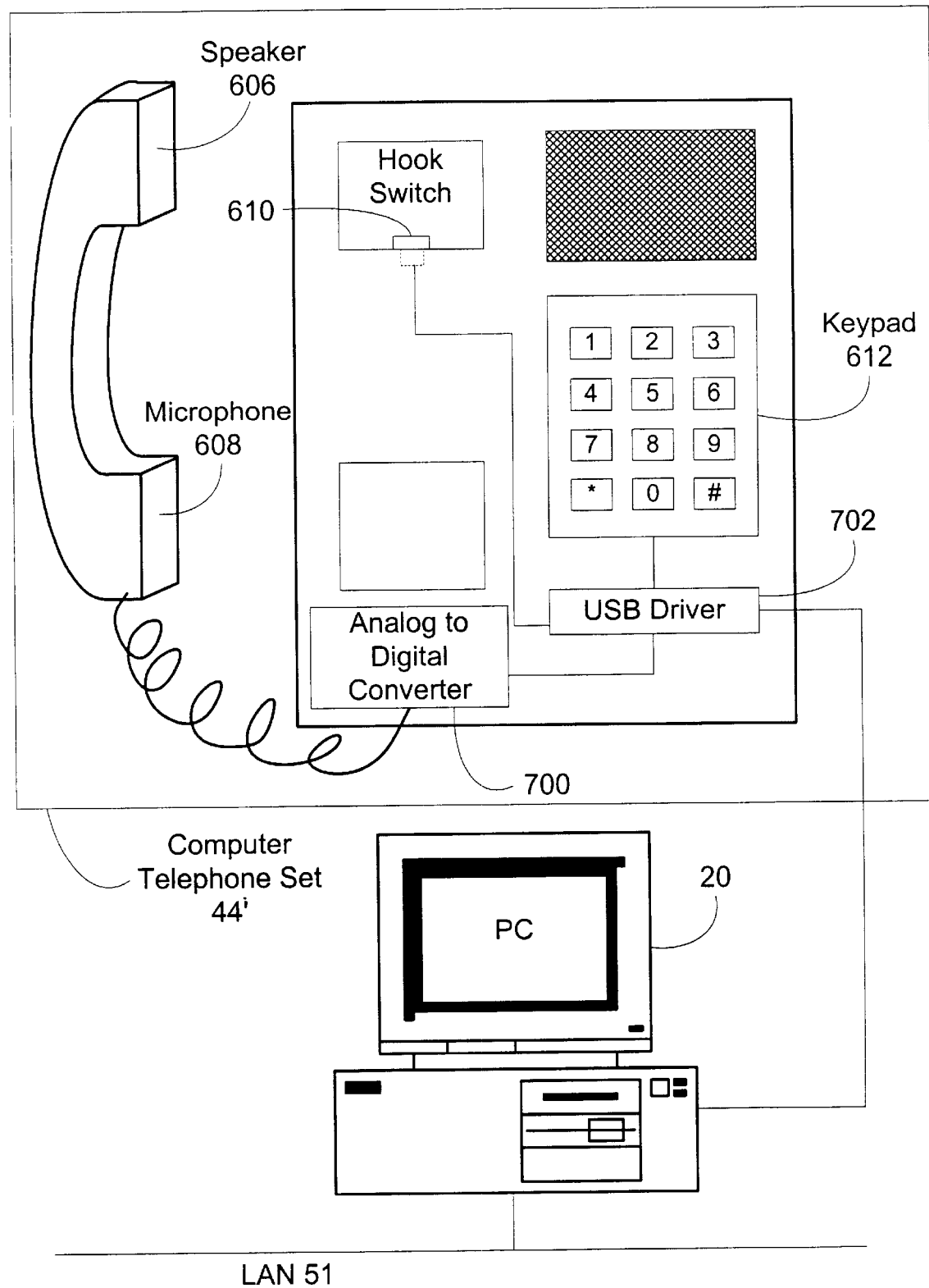
FIG. 7 illustrates how simple the hardware of a "dumb" computer telephone set can become when all call processing is moved to the computer.

FIG. 7 shows how simple the hardware of a "dumb" computer telephone set 44' can become when all call processing is moved to the host computer 20.

An analog-to-digital converter (A/D) 700 connects the USB driver 702 with the telephone's analog devices. The A/D accepts analog voice input from the microphone 608, digitizes the input, and sends the result to the host computer 20 via the USB driver. Digital sound received by the USB driver from the host computer is converted to analog by the A/D and rendered over the speaker 606. The hook switch 610 and keypad 612 consist of switches that signal their state changes to the computer via the USB driver.

While a basic telephone has been described, developers may choose to add further functionality such as a ringer, status lights, information displays, more input buttons, another speaker to make the device function as a speakerphone, a headset in addition to or instead of the handset, etc. Including support for these extra functions is a straightforward task for those skilled in the art.

Note that no processing, other than that required to signal switch events, convert sound between analog and digital formats, and run the USB protocol, is required on the telephone 44'. Especially, the telephone has no mechanism for transporting voice to distant users: the present invention allows that function to be moved in its entirety to the host computer.

Communications Between the "Dumb" Computer Telephone Set and the Host Computer Communications between the host computer and the "dumb" computer telephone set are straightforward. The telephone set informs the host computer of status changes and human inputs while the host computer sends commands to the telephone set, instructing it to, among other things, render output data suitable to the telephone set. The basic communications tasks are as follows:

On connection or power up, the telephone set tells the host computer what it is. In another embodiment, the host computer polls to determine what type of peripheral devices are connected to it.

The telephone set notifies the host computer when the handset is taken off the hook switch and when it is replaced.

The telephone set tells the host computer that any buttons (for keypad dialing or any other control) have been pressed.

The telephone set captures the user's voice on the microphone and sends it to the host computer.

The computer sends telephony signaling tones (ringing, ring back, dial tone, etc.) to be played over the telephone set's speaker. Note that the telephone set need not understand the significance of these tones. With all call processing performed on thehost computer, the telephone set need only play the sounds.

The host computer sends the remote user's voice to be played over the telephone set's speaker.

The host computer may request status information from the telephone set (e.g., the status of the hook switch). Further communications tasks may be added to support optional features:

The host computer tells the telephone set to light or extinguish any status lights it might support.

The host computer sends messages to the telephone set's display (e.g., caller ID, call duration, date, and time of day).

If the telephone set is a speakerphone, the host computer can direct sound output to the speakerphone speaker rather than to the handset speaker.

In the description given above, in the event of an incoming call, the host computer rings the telephone set by sending a ringing tone to play on its speaker.

Alternatively, the host computer can command a separate ringing device to ring.

The USB standards support one embodiment of this communications interface. For a description of those standards, please refer to "Universal Serial Bus Specification," "Universal Serial Bus Device Class Definition for Audio Devices," especially Appendix C, and "Universal Serial Bus (USB) Device Class Definition for Human Interface Devices (HID)" which, in their entireties, are incorporated herein by reference.

Conclusion

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

What is claimed is:

1. An application programming interface (API) on a personal computer (PC), the API containing functional attributes that are presented to a computer telephony application running on the PC that are substantially all the functionality required for operating a telephone set connected to the PC, said functional attributes presented by the API to the computer telephony application including (1) attributes for getting and setting configuration information on the telephone set, (2) attributes for getting status on the telephone set, (3) attributes for the notification of events occurring on the telephone set, (4) attributes for rendering telephone signaling tones on the telephone set, and (5) attributes for rendering speech onto and capturing speech from the telephone set.

2. The API of claim 1 wherein the computer telephony application can render telephone signaling tones on the telephone set without directly accessing an audio API.

3. The API of claim 1 wherein the functional attributes presented by the API to the computer telephony application further include (6) attributes for listing telephone sets that are available for use on the PC and (7) attributes for seizing an available telephone set for use and releasing it.

4. The API of claim 1 wherein the API presents the functional attributes to the computer telephony application in a manner independent of the hardware implementation of the telephone set.

5. The API of claim 1 comprising software objects.

6. The API of claim 5 wherein the functional attributes of the telephone set are presented essentially in one software object.

7. The API of claim 1 comprising software routines running on the PC.

8. The API of claim 1 wherein the telephone set is in the group: hand set, speakerphone, headset, videophone.

9. A computer-readable medium containing instructions that when executed by a PC provide the API of claim 1.

10. A telephone manager routine running in the operating system of a PC, the telephone manager routine providing telephony services, the telephony services provided including finding a telephone set that is connected to the PC and that is available for use, seizing the available telephone set, associating a telephone call with the telephone set, getting and setting configuration information on the telephone set, setting the call state of the telephone call, transitioning the telephone call through call states in response to events occurring on the telephone call, rendering telephone signaling tones on the telephone set, and rendering speech onto and capturing speech from the telephone set.

11. The telephone manager routine of claim 10 wherein the telephone manager routine provides telephony services to a human user.

12. The telephone manager routine of claim 10 wherein the telephone manager routine provides telephony services to a computer telephony application.

13. The telephone manager routine of claim 10 wherein associating a telephone call with the telephone set involves answering an incoming telephone call on the telephone set.

14. The telephone manager routine of claim 10 wherein associating a telephone call with the telephone set involves initiating an outgoing telephone call on the telephone set.

15. The telephone manager routine of claim 14 further providing support for addressing an outgoing telephone call based on the called party's telephone number.

16. The telephone manager routine of claim 15 further providing logic for determining when a user has entered enough numbers to completely specify the called party's telephone number.

17. The telephone manager routine of claim 14 further providing support for addressing an outgoing telephone call based on the called party's e-mail address or Internetworking Protocol address.

18. The telephone manager routine of claim 10 wherein the telephony services are provided in a manner independent of the hardware implementation of the telephone set.

19. The telephone manager routine of claim 10 wherein the telephone set is in the group: hand set, speakerphone, headset, videophone.

20. A computer-readable medium containing instructions that when executed by a PC perform the telephone manager routine of claim 10.

21. A method for providing a telephone connection on a PC, comprising capturing local voice via a microphone of a telephone set attached to the PC, transmitting the local voice to the PC, receiving remote voice on the PC, transmitting the remote voice to the telephone set, rendering the remote voice on a speaker of the telephone set, and running logic in an operating system on the PC to set the call state of the telephone connection and to transition the telephone connection through call states in response to events occurring on the telephone connection.

22. The method of claim 21 wherein the telephone set is in the group: hand set, speakerphone, headset.

23. A computer-readable medium containing instructions that when executed by a PC perform the method of claim 21.

24. A system for providing a telephone connection on a PC, comprising a telephone set connected to the PC and logic running in an operating system on the PC to set the call state of the telephone connection and to transition the telephone connection through call states in response to events occurring on the telephone connection, wherein the telephone set comprises:

- a human interface for capturing input from a human and for rendering output to the human;
- a digital communications interface for communicating with the PC;
- a first translator for translating the input from the human and for delivering the translated input to the digital communications interface; and
- a second translator for translating data received from the digital communications interface and for delivering the translated data to the human interface.

25. The system of claim 24 wherein the human interface comprises a first speaker and a first microphone, and wherein the telephone set further comprises an analog-to-digital converter connecting the first speaker and the first microphone to the digital communications interface.

26. The system of claim 25, wherein the telephone set further comprises:

- at least one input device other than the first microphone; and
- a connection between the at least one input device other than the first microphone and the digital communications interface.

27. The system of claim 26, wherein the at least one input device other than the first microphone is in the group: a second microphone, hook switch, keypad, and camera.

28. The system of claim 25, wherein the telephone set further comprises:

- at least one output device other than the first speaker; and
- a connection between the at least one output device other than the first speaker and the digital communications interface.

29. The system of claim 28, wherein the at least one output device other than the first speaker is in the group: a second speaker, alphanumeric display, status light, and video display.

30. The system of claim 28, wherein the at least one output device other than the first speaker is a video display and further comprising:

- a video camera; and
- a connection between the video camera and the digital communications interface.

* * * * *